US012801486B2

(12) United States Patent
Lee et al.

(10) Patent No.: US 12,801,486 B2
(45) Date of Patent: Nov. 17, 2026

(54) STORAGE DEVICE PERFORMING CORRECTIVE PROGRAM OPERATION

(71) Applicant: SK hynix Inc., Gyeonggi-do (KR)

(72) Inventors: Changhyun Lee, San Jose, CA (US); Dengtao Zhao, San Jose, CA (US); Mohammad Taghi Sharbati, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 19/062,755

(22) Filed: Feb. 25, 2025

(65) Prior Publication Data

US 2026/0252436 A1 Aug. 27, 2026

(51) Int. Cl.
*G06F 11/07* (2006.01)

(52) U.S. Cl.
CPC ........ *G06F 11/0793* (2013.01); *G06F 11/073* (2013.01)

(58) Field of Classification Search
CPC ........................... G06F 11/0793; G06F 11/073
USPC ........................................................... 714/6.1
See application file for complete search history.

(56) References Cited

U.S. PATENT DOCUMENTS 11,960,722 B2 4/2024 Tanaka et al.
2021/0043264 A1* 2/2021 Sarin ..................... G06F 7/5443
2023/0360705 A1 11/2023 Tseng et al.
2024/0231617 A1 7/2024 Tanaka et al.
2026/0004860 A1* 1/2026 Lee ...................... G11C 16/102

* cited by examiner

*Primary Examiner* — Yair Leibovich
(74) *Attorney, Agent, or Firm* — IP&T GROUP LLP

(57) ABSTRACT

A storage device includes a target group of non-volatile memory cells and a peripheral circuit. Each of the non-volatile memory cells stores multiple data bits. The peripheral circuit includes page buffers coupled to the respective memory cells. The peripheral circuit performs a normal program operation on the target group, and performs, according to data loaded on the page buffers, a corrective program operation on one or more selected memory cells that are supposed to have threshold voltages corresponding to one or more predetermined program states within the target group.

16 Claims, 6 Drawing Sheets

STORAGE DEVICE PERFORMING CORRECTIVE PROGRAM OPERATION

BACKGROUND

1. Field

Embodiments of the present invention relate to a storage device.

2. Description of the Related Art

A storage system stores data in response to a request from a host system such as a computer, smartphone, or smart pad. An example of a storage system is a system configured to store data in a semiconductor memory, especially in a nonvolatile memory, such as a solid-state drive (SSD) or a memory card.

A storage system includes a storage device configured to store data and a controller configured to control the storage device. Generally, a storage device can be volatile or non-volatile. Examples of a non-volatile storage device are Read Only Memory (ROM), Programmable ROM (PROM), Electrically Programmable ROM (EPROM), Electrically Erasable and Programmable ROM (EEPROM), flash memory, Phase-change RAM (PRAM), Magnetic RAM (MRAM), Resistive RAM (RRAM), and Ferroelectric RAM (FRAM).

SUMMARY

In an embodiment of the present invention, a storage device may include a target group of non-volatile memory cells and a peripheral circuit. Each of the non-volatile memory cells may be configured to store multiple data bits. The peripheral circuit may include page buffers coupled to the respective memory cells. The peripheral circuit may be configured to perform a normal program operation on the target group, and perform, according to data loaded on the page buffers, a corrective program operation on one or more selected memory cells that are supposed to have threshold voltages corresponding to one or more predetermined program states within the target group. The corrective program operation may include one or more program loops each comprising one or more program pulse application operations and a series of consecutive verification operations for the predetermined program states. The peripheral circuit may perform the corrective program operation by applying, during each of the program pulse application operations in each of the program loops, a currently selected program pulse to one or more target memory cells under a program-permission mode among the selected memory cells while program-inhibiting remaining memory cells under a program-inhibition mode among the selected memory cells. The peripheral circuit may apply the currently selected program pulse to the target memory cells by determining, in between current and subsequent ones among the program pulse application operations, each of the selected memory cells as under the program-permission mode or the program-inhibition mode for the subsequent program pulse application operation through update of current data, which is currently loaded on a corresponding one of the page buffers for the current program pulse application operation. The peripheral circuit may perform the update by performing a logical operation on the current data and reference data representing a target program state, for which a subsequently selected program pulse is to be applied during the subsequent program pulse application operation. The currently and subsequently selected program pulses may belong to program pulses to be applied for the predetermined program states. The target program state may belong to the predetermined program states.

A number of the multiple data bits may be 'n', where n is a natural number of 2 or more. The predetermined program states belong to $2^n$ states.

The $2^n$ states include an erase state and $1^{st}$ to $(2^n-1)^{th}$ program states of an ascending order. The predetermined program states includes at least one among the $1^{st}$ and relatively lower program states which are cell-to cell coupling (CTCC) or among relatively higher program states and $(2^n-1)^{th}$ program state which are vulnerable to quick charge loss (QCL).

Levels of the program pulses may step up according to the predetermined program states. Levels of the verification pulses may step up according to the predetermined program states.

The peripheral circuit may perform, during each of the program loops, the series of consecutive verification operations by consecutively applying respective verification pulses to the target group.

The peripheral circuit may perform the program loops respectively for the predetermined program states. The one or more program pulse application operations within each of the program loops may include a single program pulse application operation for a corresponding one among the predetermined program states. The peripheral circuit may perform, during each of the program loops, the single program pulse application operations by applying a single program pulse to the target group. A level of the single program pulse may step up over the program loops respectively for the predetermined program states.

The one or more program pulse application operations within each of the program loops may include a series of consecutive program pulse application operations for the respective predetermined program states. The peripheral circuit may perform, during each of the program loops, the series of consecutive program pulse application operations by consecutively applying respective program pulses to the target group.

The normal program operation may include one or more program loops each comprising one or more program pulse application operations and one or more verification operations for each of program states representing combination of the multiple data bits. A verification pulse to be applied for a selected one among the predetermined program states during the verification operation within the corrective program operation may have a higher level than a verification pulse to be applied for the selected program state during the verification operation within the normal program operation.

The current data currently loaded on the corresponding page buffer for the current program pulse application operation may be data loaded, by the peripheral circuit, on the corresponding page buffer during an immediately previous program loop for the target group.

The previous program loop for the target group may be a last program loop within the normal program operation for the target group.

The storage device may further include a neighboring group of non-volatile memory cells each configured to store multiple data bits, the neighboring group being adjacent to the target group. The peripheral circuit may perform the normal program operation on the neighboring group between the normal and corrective program operations on the target group.

The current data currently loaded on the corresponding page buffer for the current program pulse application operation may be data re-issued, by the peripheral circuit. on the corresponding page buffer for the predetermined program states immediately after a previous program loop for the neighboring group.

The previous program loop for the neighboring group may be a last program loop within the normal program operation on the neighboring group.

The current data currently loaded on the corresponding page buffer for the current program pulse application operation may be data read from the target group and loaded, by the peripheral circuit, on the corresponding page buffer for the predetermined program states immediately after a previous program loop for the neighboring group.

The previous program loop for the neighboring group may be a last program loop within the normal program operation on the neighboring group.

The peripheral circuit may obtain the read data error-corrected and load the error-corrected data on the corresponding page buffer.

Additional embodiments of the present invention will become apparent from the following description.

DETAILED DESCRIPTION

Figure 1:
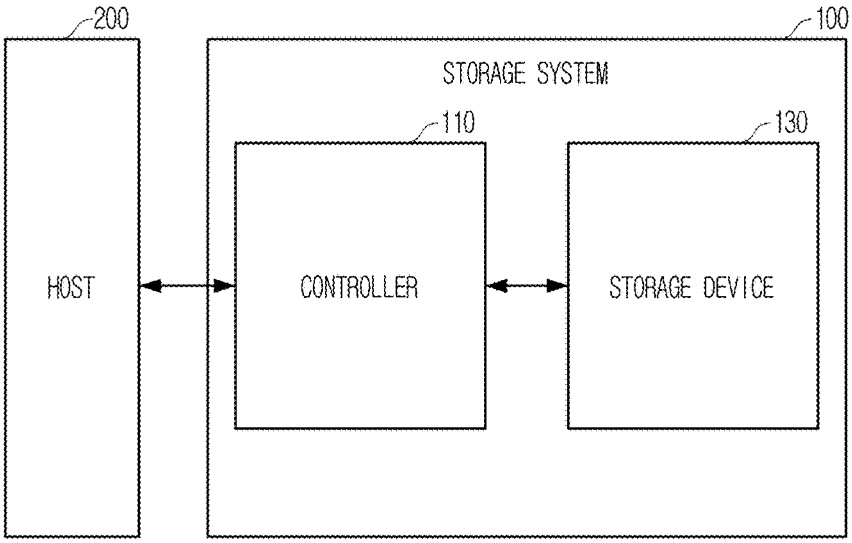
FIG. 1 is a block diagram illustrating a storage system.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout this disclosure, like reference numerals refer to like parts in the figures and embodiments of the present invention.

The present invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as embodiments. In general, the order of the operations of disclosed processes may be altered within the scope of the present invention. Unless stated otherwise, a component such as a processor or a memory described as being suitable for performing a task may be implemented as a general device or circuit component that is configured or otherwise programmed to perform the task at a given time or as a specific device or circuit component that is manufactured to perform the task. As used herein, the term 'processor' or the like refers to one or more devices, circuits, and/or processing cores suitable for processing data, such as computer program instructions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described herein, the code or instructions for implementing the operations of the method embodiments may transform the computer, processor, controller, or other signal processing device into a special-purpose processor for performing methods herein.

FIG. 1 is a block diagram illustrating a storage system 100.

Referring to FIG. 1, the storage system 100 may include a storage device 130 and a controller 110.

The storage system 100 may access data stored therein in response to a request from a host system 200. Examples of the host system 200 include a cellular phone, a smartphone, an MP3 player, a laptop computer, a desktop computer, a game player, a TV, a tablet PC, and an in-vehicle infotainment system.

The storage system 100 may be implemented as any of various types of storage systems. For example, the storage system 100 may be implemented as a solid state drive (SSD), a multimedia card in the form of a multimedia card (MMC), (e.g., an eMMC, an RS-MMC, or a micro-MMC), a secure digital card in the form of an SD (e.g., a mini-SD or a micro-SD), a universal serial bus (USB) storage device, a universal flash storage (UFS) device, a personal computer memory card international association (PCMCIA) card type storage device, a peripheral component interconnection (PCI) card type storage device, a PCI express (PCI-e) card type storage device, a compact flash (CF) card, a smart media card, or a memory stick.

The storage system 100 may be manufactured through any of various types of packages. For example, the storage system 100 may be manufactured through a package on package (POP), a system in package (SIP), a system on chip (SOC), a multi-chip package (MCP), a chip on board (COB), a wafer-level fabricated package (WFP), or a wafer-level stack package (WSP).

The storage device 130 may access data therein. The storage device 130 may operate in response to a command from the controller 110. The storage device 130 may include a memory cell array 210 including a plurality of memory cells configured to store data therein. The memory cell array may include a plurality of memory blocks. Each of the memory blocks may include pages, each of which includes memory cells. According to an embodiment, data may be stored in and readout from the storage device 130 in units of page-sizes. Data may be erased or removed from the storage device 130 in units of block-sizes.

According to an embodiment, the storage device 130 may be any of Double Data Rate Synchronous Dynamic Random-Access Memory (DDR SDRAM), Low Power Double Data Rate4 (LPDDR4) SDRAM, Graphics Double Data Rate (GDDR) SDRAM, Low Power DDR (LPDDR), Rambus Dynamic Random Access Memory (RDRAM), NAND flash memory, Vertical NAND flash memory, NOR flash memory, resistive random-access memory (RRAM), phase-change random-access memory (PRAM), magneto-resistive random-access memory (MRAM), ferroelectric random-access memory (FRAM), spin-transfer torque random-access memory (STT-RAM) and so forth. By way of example, the storage device 130 can be a NAND flash memory in the context of the following description.

The storage device 130 may have a two-dimensional or three-dimensional array structure. The embodiments of the present invention may be applied not only to a flash memory device, in which a charge storage layer includes a conductive floating gate (FG), but also to a charge trap flash (CTF) memory device, in which a charge storage layer includes an insulating layer.

The storage device 130 may receive a command and an address from the controller 110. The storage device 130 may access, in response to the command, an area selected by the address within the memory cell array. For example, the storage device 130 may perform, in response to the command, various operations such as a write operation or a program operation, a read operation and an erase operation. For example, during the program operation, the storage device 130 may program data into the selected area. During the read operation, the storage device 130 may read data from the selected area. During the erase operation, the storage device 130 may erase or remove data from the selected area.

The controller 110 may control an operation of the storage device 130.

When a power voltage is applied to the storage system 100, the controller 110 may execute firmware such as a Flash Translation Layer (FTL) for controlling communication between the host system 200 and the storage device 130.

According to an embodiment, the controller 110 may receive data and a logical address from the host system 200 and include firmware (not shown) that translates the logical address into a physical address. A logical address may be identified by the host system 200 and may indicate a logical location within the storage device 130. A physical address may indicate an actual location within the storage device 130. The controller 110 may manage, in an operational memory, a logical-to-physical map table representing a mapping relationship between the logical address and the physical address.

In response to a request from the host system 200, the controller 110 may control the storage device 130 to perform an operation. For example, in response to a program request from the host system 200, the controller 110 may provide a program command, a physical address and data to the storage device 130. In response to a read request provided together with a logical address from the host system 200, the controller 110 may provide the storage device 130 with the read command and a physical address corresponding to the logical address. In response to an erase request provided together with a logical address from the host system 200, the controller 110 may provide the storage device 130 with an erase command and a physical address corresponding to the logical address.

Without a request from the host system 200, the controller 110 may control the storage device 130 to perform a background operation such as a program operation for wear leveling or for garbage collection.

According to an embodiment, the storage system 100 may further include an operational memory (not shown). The controller 110 may control data exchange between the host system 200 and the operational memory. The controller 110 may temporarily store, in the operational memory, system data for controlling the storage device 130. For example, the controller 110 may temporarily store, in the operational memory, data from the host system 200 and transfer the temporarily stored data to the storage device 130.

As a buffer memory, the operational memory may store codes or commands executed by the controller 110. As a cache memory, the operational memory may store data processed by the controller 110.

According to an embodiment, the operational memory may be any of DRAM such as DDR SDRAM, LPDDR4 SDRAM, GDDR SDRAM, LPDDR or RDRAM, SRAM and so forth.

The host system 200 may communicate with the storage system 100 through at least one of various communication standards or interfaces such as a Universal Serial Bus (USB), Serial AT Attachment (SATA), a Serial Attached SCSI (SAS), a High Speed Interchip (HSIC), a Small Computer System Interface (SCSI), a Peripheral Component Interconnection (PCI), PCI express (PCIe), NonVolatile Memory express (NVMe), Universal Flash Storage (UFS), Secure Digital (SD), a Multi-Media Card (MMC), an embedded MMC (eMMC), a Dual In-line Memory Module (DIMM), a Registered DIMM (RDIMM), a Load Reduced DIMM (LRDIMM) and so forth.

Figure 2:
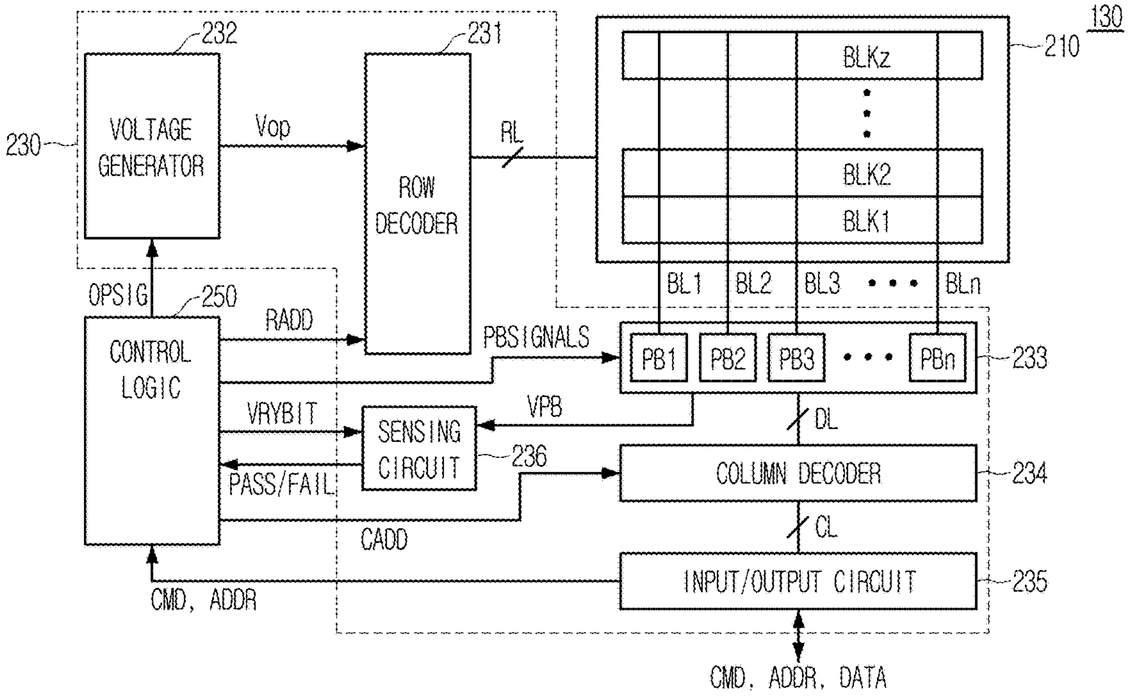
FIG. 2 is a diagram illustrating a structure of a storage device.

FIG. 2 is a diagram illustrating a structure of the storage device 130.

Referring to FIG. 2, the storage device 130 may include the memory cell array 210, an operating circuit 230 and a control logic 250. The operating circuit 230 and control logic 250 may be collectively referred to as a peripheral circuit.

The memory cell array 210 may include a plurality of memory blocks BLK1 to BLKz coupled to a row decoder 231 through row lines RL, each configured by at least one source select line, a plurality of word lines, and at least one drain select line. The plurality of memory blocks BLK1 to BLKz may be coupled to a page buffer group 233 through bit lines BL1 to BLn. Each of the plurality of memory blocks BLK1 to BLKz may include a plurality of pages. A page may be defined as a group of memory cells coupled to a single word line. The plurality of memory cells may be nonvolatile.

According to an embodiment, the memory cell array 210 may include any of a single-level cell (SLC), a multi-level cell (MLC), a triple-level cell (TLC), a quadruple-level cell (QLC), a penta-level cell (PLC) and a further-higher-level cell, which will not limit the scope of the present disclosure.

The operating circuit 230 may be operable under the control of the control logic 250. The operating circuit 230 may perform an operation on a selected area within the memory cell array 210. The operating circuit 230 may drive the memory cell array 210. For example, the operating circuit 230 may apply various operating voltages to the row lines RL and the bit lines BL1 to BLn or discharge the applied voltages.

The operating circuit 230 may include the row decoder 231, a voltage generator 232, the page buffer group 233, a column decoder 234, an input/output circuit 235 and a sensing circuit 236.

The row decoder 231 may be coupled to the memory cell array 210 through the row lines RL. Within the row lines RL, the word lines may include normal word lines and dummy word lines. The row lines RL may further include a pipe select line.

The row decoder 231 may decode a row address RADD from the control logic 250. The row decoder 231 may select, according to the decoded address, at least one from the memory blocks BLK1 to BLKz. The row decoder 231 may select, according to the decoded address, at least one from the word lines coupled to the selected memory block to apply a voltage Vop from the voltage generator 232 to the selected word line.

For example, during a program pulse process, the row decoder 231 may apply a program voltage to the selected word line and a program pass voltage to unselected word lines. During a verification process, the row decoder 231 may apply a verification voltage to the selected word line and a verification pass voltage to the unselected word lines. During a read operation, the row decoder 231 may apply a read voltage to the selected word line and a read pass voltage to the unselected word lines. During an erase operation, the row decoder 231 may select, according to the decoded address, one of the memory blocks BLK1 to BLKz and may apply a ground voltage to word lines coupled to the selected memory block.

The voltage generator 232 may operate under the control of the control logic 250. The voltage generator 232 may generate various operating voltages Vop through an external power voltage supplied to the storage device 130 or an internal power voltage regulated from the external power voltage. The voltage generator 232 may generate, in response to an operation signal OPSIG, the operating voltages Vop for program, read and erase operations. For example, the voltage generator 232 may generate a program voltage, a verification voltage, a pass voltage, a read voltage, and an erase voltage.

The page buffer group 233 may include first to n-th page buffers PB1 to PBn coupled to the memory cell array 210 through the respective first to n-th bit lines BL1 to BLn. The first to n-th page buffers PB1 to PBn may operate under the control of the control logic 250. The first to n-th page buffers PB1 to PBn may operate in response to page buffer control signals PBSIGNALS. The first to n-th page buffers PB1 to PBn may temporarily store therein data provided through the first to n-th bit lines BL1 to BLn or may sense voltages or currents of the bit lines BL1 to BLn during a read or verification process.

When a program voltage is applied to a selected word line during a program pulse process, the first to n-th page buffers PB1 to PBn may transfer data DATA from the column decoder 234 and the input/output circuit 235 to selected memory cells through the first to n-th bit lines BL1 to BLn. Memory cells of the selected page may be programmed according to the transferred data DATA. During a verification process, the first to n-th page buffers PB1 to PBn may sense a voltage or a current from the first to n-th bit lines BL1 to BLn to read page data from the selected memory cells.

Under the control of the column decoder 234 during a read operation, the first to n-th page buffers PB1 to PBn may read the data DATA from the memory cells of the selected page through the first to n-th bit lines BL1 to BLn and may output the read data DATA to the input/output circuit 235.

During an erase operation, the first to n-th page buffers PB1 to PBn may float the first to n-th bit lines BL1 to BLn or may apply an erase voltage to the first to n-th bit lines BL1 to BLn.

The column decoder 234 may transfer data between the input/output circuit 235 and the page buffer group 233 according to a column address CADD. For example, the column decoder 234 may exchange data with the first to n-th page buffers PB1 to PBn through data lines DL and with the input/output circuit 235 through column lines CL.

The input/output circuit 235 may transfer a command CMD and an address ADDR from the controller 110 to the control logic 250 and may exchange the data DATA with the column decoder 234.

During a read operation or a verification process, the sensing circuit 236 may generate a reference current according to an allowable bit VRYBIT. The sensing circuit 236 may compare a sensing voltage VPB from the page buffer group 233 with a reference voltage generated by the reference current. As the result of the comparison, the sensing circuit 236 may output a pass signal PASS or a fail signal FAIL.

In response to the command CMD and the address ADDR, the control logic 250 may control the operating circuit 230 through the operation signal OPSIG, the row address RADD, the page buffer control signals PBSIGNALS and the allowable bit VRYBIT. The control logic 250 may control a read operation on a selected memory block in response to a sub-block read command and an address. The control logic 250 may control an erase operation on a selected sub-block included in the selected memory block in response to a sub-block erase command and the address. The control logic 250 may determine whether a verification process passes or fails according to the pass or fail signal PASS or FAIL.

Figure 3:
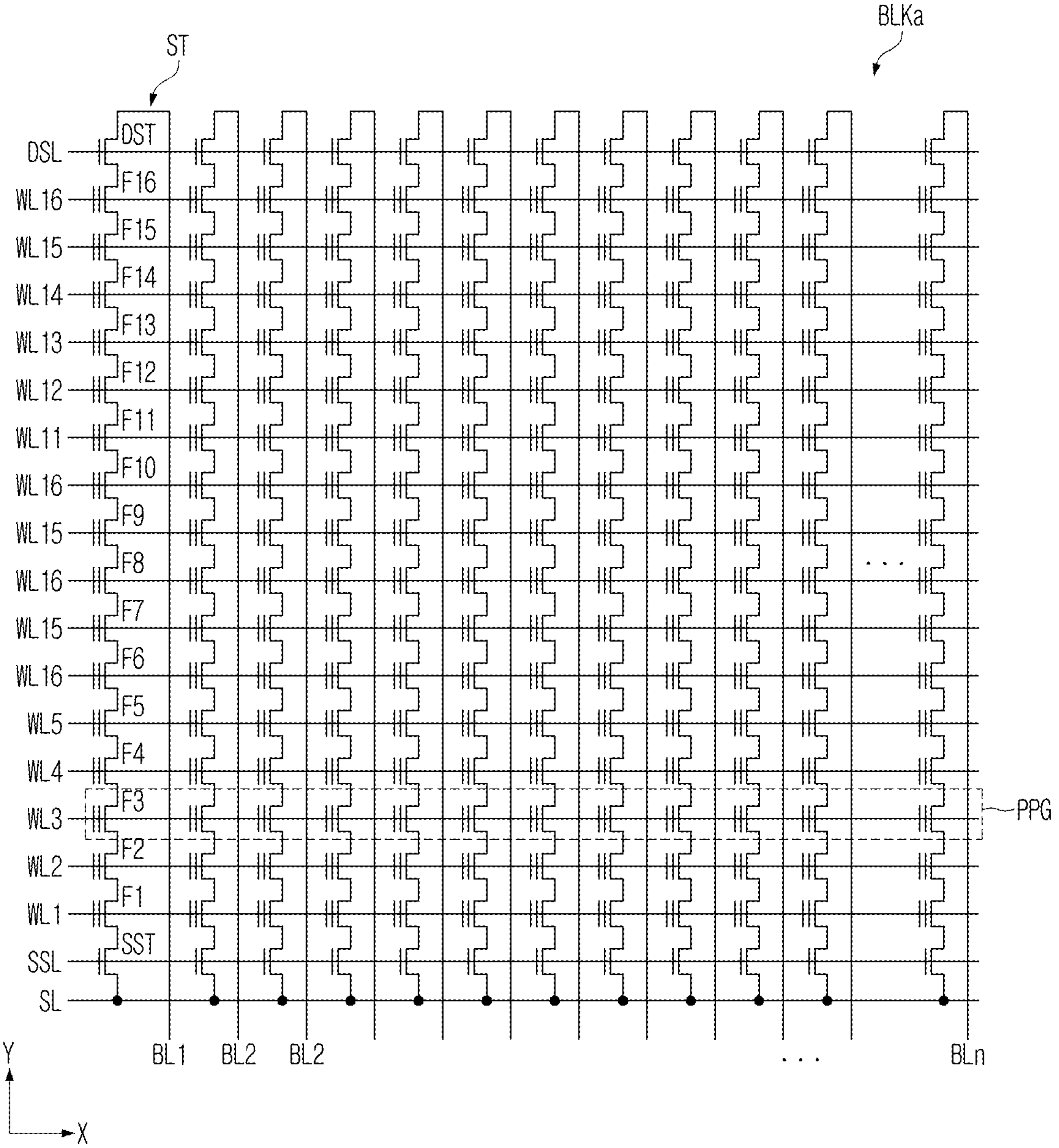
FIG. 3 is a diagram illustrating an example of a memory cell array.

FIG. 3 is a diagram illustrating an example of the memory cell array 210. FIG. 3 is a circuit diagram showing a representative memory block BLKa among the plurality of memory blocks BLK1 to BLKz in the memory cell array 210.

A first select line, word lines, and a second select line arranged in parallel with each other may be coupled to the memory block BLKa. The word lines may be arranged in parallel with each other between the first and second select lines. The first select line may be a source select line SSL and the second select line may be a drain select line DSL.

The memory block BLKa may include a plurality of strings coupled between the bit lines BL1 to BLn and a source line SL. The bit lines BL1 to BLn may be coupled to the respective strings and the strings may be commonly coupled to the source line SL. The strings may have the same configuration and a string ST coupled to the first bit line BL1 is described in detail as an example.

The string ST may include a source select transistor SST, a plurality of memory cells F1 to F16, and a drain select transistor DST coupled in series between the source line SL and the first bit line BL1. Although not illustrated, each string ST may include plural source select transistors SST, plural drain select transistors DST and more than the 16 memory cells F1 to F16.

A source of the source select transistor SST may be coupled to the source line SL and a drain of the drain select transistor DST may be coupled to the first bit line BL1. The memory cells F1 to F16 may be coupled in series between the source select transistor SST and the drain select transistor DST. Gates of the source select transistors SST included in different strings may be coupled to the source select line SSL. Gates of the drain select transistors DST included in the different strings may be coupled to the drain select line DSL. Gates of the memory cells F1 to F16 included in the different strings may be coupled to respective word lines WL1 to WL16. A group of memory cells coupled to the same word line among memory cells included in different strings may be referred to as a physical page PPG. The memory block BLKa may include as many physical pages PPG as the number of word lines WL1 to WL16.

The single physical page PPG including SLCs may store data of a single logical page LPG. The data of the single logical page LPG may include as many bits of data as the number of memory cells included in the single physical page PPG. The single physical page PPG including MLCs may store data of two or more logical pages LPG.

According to an embodiment, a memory block may have a three-dimensional structure. Each memory block may include a plurality of memory cells stacked over a substrate. The plurality of memory cells may be arranged in a +X direction, a +Y direction, and a +Z direction.

In an embodiment, the combination of the operating circuit 230 and the control logic 250 may be referred to as a control circuit. The control circuit may perform an operation on the memory cell array 210 as described herein. The control circuit may perform an operation on the memory cell array 210, as discussed herein.

Figure 4:
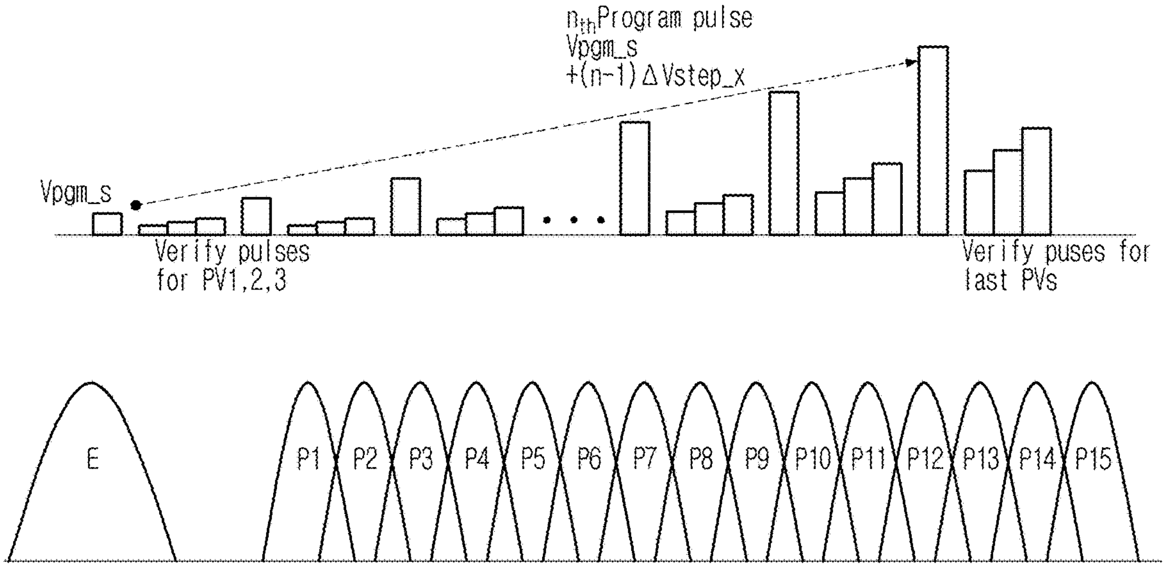
FIG. 4 is diagrams illustrating an operation of applying program pulses and verification pulses in between the program pulses to program cells to corresponding program states.

FIG. 4 is diagrams illustrating an operation of applying program pulses and verification pulses in between the program pulses to program cells to corresponding program states.

Referring to FIG. 4, program data are loaded into the first to n-th page buffers PB1 to PBn connected to the bit-lines of the memory cell array 210. A single program pulse application operation of applying a single program pulse to all cells except for the erased cells. A verification operation immediately follows the single program pulse application operation. If the cell passes a corresponding verification level, the cell is under the program-inhibition mode. By repeating the alternation of the program pulse application operation and the verification operation, all cells become programmed to corresponding program states or corresponding program levels.

Figure 5:
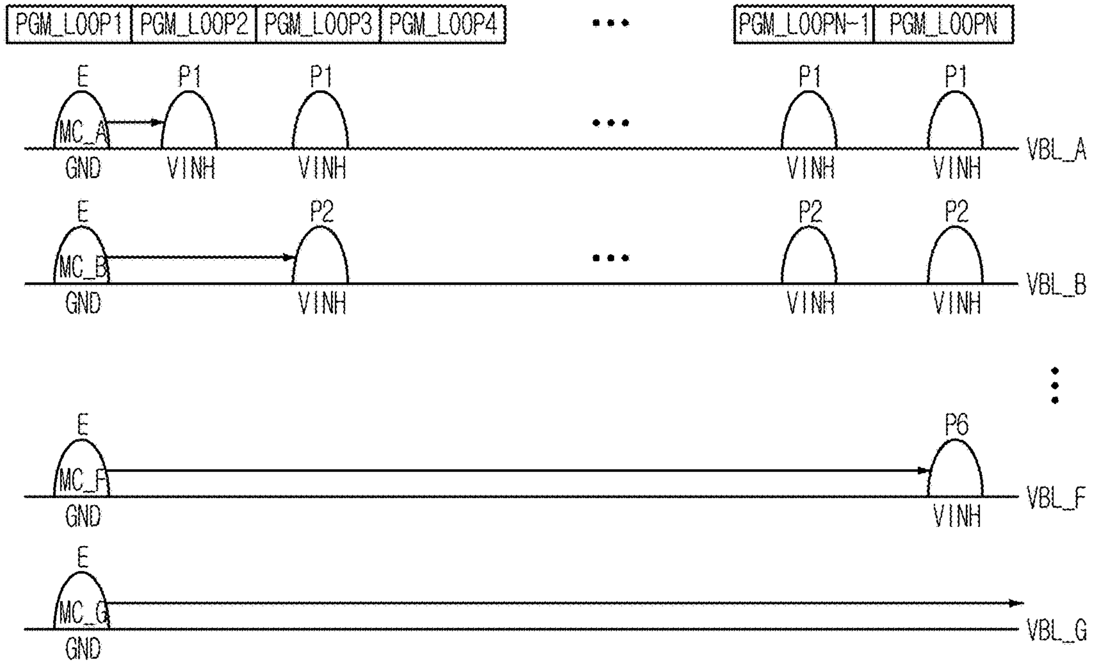
FIG. 5 is a diagram illustrating a program operation according to a program loop scheme.

FIG. 5 is a diagram illustrating a program operation according to a program loop scheme.

Referring to FIG. 5, a plurality of program loops PGM_LOOP1 to PGM_LOOPN, where N is any suitable natural number of 2 or more, are performed on selected memory cells during a program operation. A single program operation on a page may comprise the 'N' number of program loops PGM_LOOP1 to PGM_LOOPN at maximum. Each of the plurality of program loops PGM_LOOP1 to PGM_LOOPN may include the program pulse application operation and the verification operation.

In FIG. 5, by way of example, memory cells are TLCs and programmed from the erase state E to one of first to seventh program states P1 to P7.

As an example, among the selected memory cells to which the program operation is performed, memory cells MC_A may be programmed to the first program state P1, memory cells MC_B to the second program state P2, memory cells MC_C to the third program state P3, memory cells MC_D to the fourth program state P4, memory cells MC_E to the fifth program state P5, memory cells MC_F to the sixth program state P6 and memory cells MC_G to the seventh program state P7. When the program operation is permitted, a voltage of a bit line coupled to each of memory cells MC_A to MC_F may be set to the ground voltage GND or a VM voltage, which is 1V as an example.

In FIG. 5, all memory cells MC_A are programmed to the first program state P1 in the first program loop PGM_LOOP1. Accordingly, a program operation on the memory cells MC_A may be inhibited from the second program loop PGM_LOOP2. Accordingly, from the second program loop PGM_LOOP2, a voltage level of a bit line VBL_A coupled to each of the memory cells MC_A may be set to the program inhibition voltage level VINH.

In FIG. 5, all memory cells MC_B are programmed to the second program state P2 in the second program loop PGM_LOOP2. Accordingly, a program operation on the memory cells MC_B may be inhibited from the third program loop PGM_LOOP3. Accordingly, from the third program loop PGM_LOOP3, a voltage level of a bit line VBL_B coupled to each of the memory cells MC_B may be set to the program inhibition voltage level VINH.

In FIG. 5, all memory cells MC_F are programmed to the sixth program state P6 in the $(N-1)^{th}$ program loop PGM_LOOPN-1. Accordingly, a program operation on the memory cells MC_F may be inhibited from the Nth program loop PGM_LOOPN. Accordingly, from the Nth program loop PGM_LOOPN, a voltage level of a bit line VBL_F coupled to each of the memory cells MC_F may be set to the program inhibition voltage level VINH. When all memory cells MC_G are programmed to the seventh program state P7 in the Nth program loop PGM_LOOPN, all memory cells MC_A to MC_F may be regarded as properly programmed and thus the program operation may then end.

Figure 6:
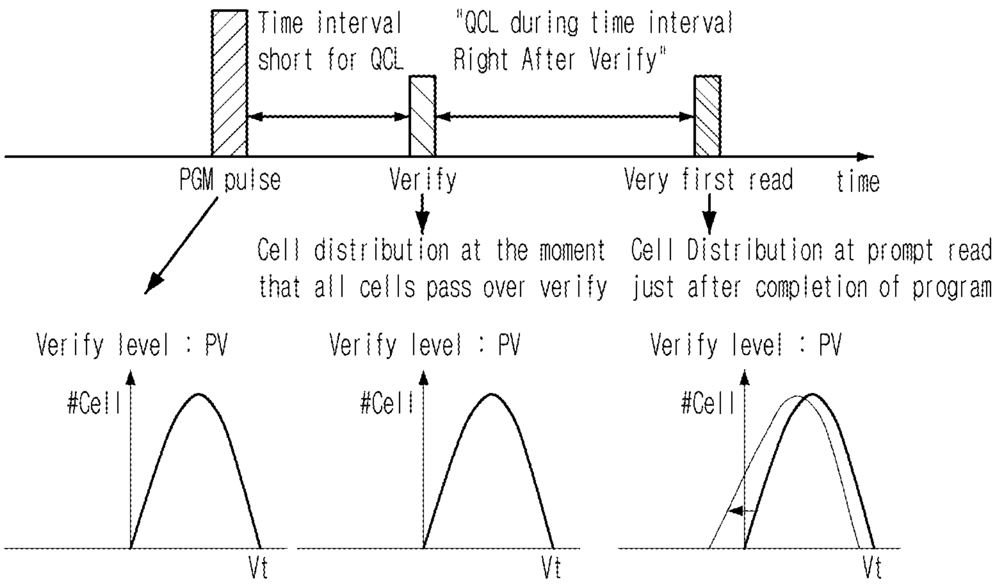
FIG. 6 is a diagram illustrating a quick charge loss (QCL) phenomenon.

FIG. 6 is a diagram illustrating the quick charge loss (QCL) phenomenon.

The QCL is a phenomenon with a memory cell. Injected charges can either redistribute or escape back in a short time so that the memory cell will exhibit a drop of the threshold voltage thereof in a short time, typically 10 ms time scale. This QCL issue becomes a greater concern as a 3D NAND device keeps scaling and especially when tight threshold voltage distributions are required for, for example, a quadruple-level cell (QLC), a penta-level cell (PLC) or a greater-bit-per-cell.

The QCL occurs after a conventional program loop, i.e., both the program pulse application operation and the verification operation in a storage device 130. The verification operation is not able to identify Vt drop due to QCL because the Vt drop due to QCL happens after a certain time delay longer than the time gap between the program pulse application operation and the verification operation.

For example, a PLC can belong to any of 32 states including one erase state and 31 program states. Conventional procedure of program in a storage device 130 comprises a program pulse application operation followed by a verification operation. The time gap between the program pulse application operation and the verification operation of applying a verification pulse is not long enough to identify Vt drop due to the QCL. Therefore, even though bits pass over the verification level by the verification operation, the cell Vt drops due to QCL results in no chance to program the cell again because the verification operation has been completed with a result of the pass.

As a result, the program cell distribution becomes wider, which causes a read failure at a read operation after the program loop. Such QCL phenomenon presents a technical challenge to operate more bits per cell, such as, quadruple-level cell (QLC) and PLC of a storage device 130 requiring an extremely tight cell distribution margin.

A possible solution for the QCL phenomenon is to perform an extra program operation. This extra program operation will push a memory cell with the QCL phenomenon, which drops the threshold voltage thereof, back to the originally intended verification level or higher. However, apparently this extra program operation is at the cost of program time.

Another possible solution for the QCL phenomenon is, as a re-programming scheme, a fine program operation of foggy-fine program operation.

Figure 7:
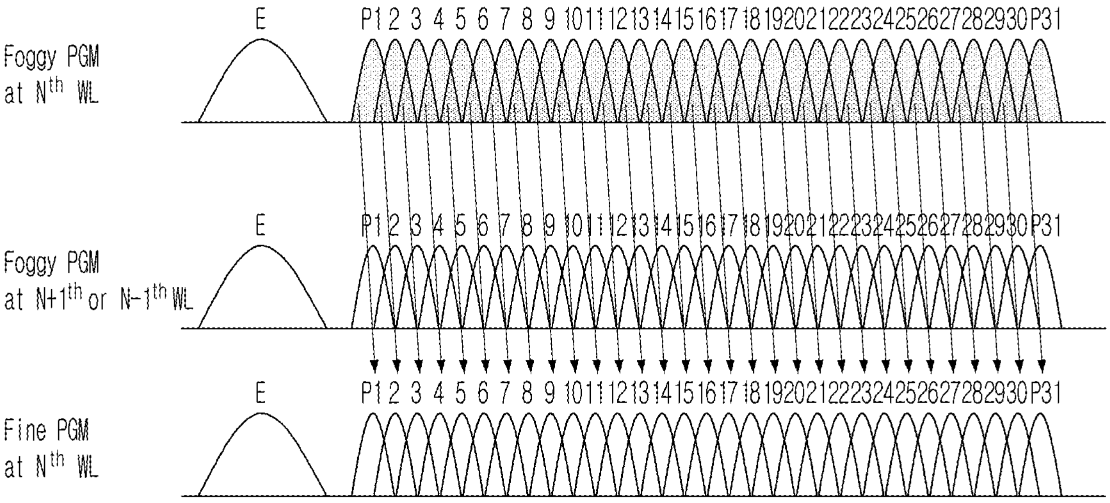
FIG. 7 schematically illustrates a conventional program operation including foggy program operation and fine program operation on PLCs.

FIG. 7 illustrates a conventional program operation including foggy program operation and fine program operation on PLCs.

Referring to FIG. 7, for instance, the PLCs coupled to a N-th word line are first programmed, by the foggy program operation, for the PLCs to have threshold voltages corresponding to the entire 32 states (i.e., one erase state and 31 program states), and then secondly programmed, by the fine program operation, for the PLCs to have the threshold voltages the entire 32 states, which correspond to the tighter threshold voltage distribution than the 32 states formed through the foggy program operation. Between the foggy and fine program operations on the N-th word line, another foggy program operation may be performed on a neighboring word line, i.e., the (N+1)-th or (N−1)-th word line. During each of the foggy and fine program operations, corresponding program data are provided to the first to n-th page buffers PB1 to PBn connected to the bit-lines of the memory cell array 210.

During the time delay between the foggy and fine program operations on the PLCs coupled to the N-th word line, the QCL may occur in the PLCs coupled to the N-th word line and therefore the fine program operation is performed on the PLCs coupled to the N-th word line to re-program the PLCs having lower threshold voltages than the verification levels due to the QCL, which results in a tighter threshold voltage distribution. However, according to the conventional foggy-fine program scheme, the PLCs are programmed to have the threshold voltages corresponding to the entire 32 states during the fine program operation, which consumes a full number of program pulses and therefore, as a drawback, increases the program time and degrades the program and pass disturb that the erase PLCs are soft-programmed due to the excessive number of program pulses and the program-inhibit stress.

Figure 8:
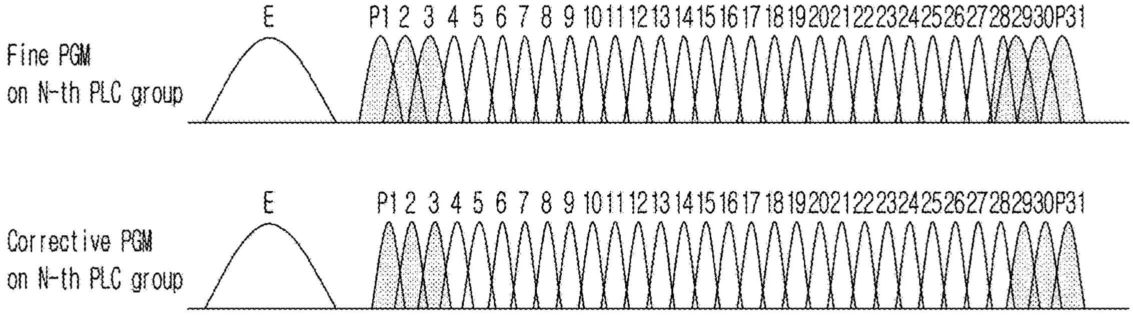
FIG. 8 schematically illustrates a program scheme including normal program operation and corrective program operation on PLCs according to an embodiment of the present invention.

FIG. 8 schematically illustrates a program scheme including foggy and fine program operations and corrective program operation on PLCs according to an embodiment of the present invention.

According to an embodiment of the present invention, the foggy and fine program operations may be collectively regarded as a normal program operation of programming memory cells for all erase and program states that are supposed to be formed according to input program data. That is, the normal program operation may be regarded as the foggy and fine program operations in this disclosure. By way of an example, FIG. 8 shows the fine program operation as a part of the normal program operation and the corrective program operation.

An embodiment of the present invention provides an improved program scheme of the storage device 130 to reduce the total number of times that the program pulse is applied, thereby reducing the program time and mitigating the program and pass disturb that the erase PLCs are soft-programmed.

Referring to FIG. 8, the program scheme includes normal program operation and corrective program operation on PLCs coupled to a N-th word line within an array of PLCs coupled to a plurality of word lines. Herein after, the PLCs coupled to a N-th word line may be referred to as a N-th PLC group within the array of PLCs including a plurality of PLC groups coupled to the respective word lines. The array of PLCs may correspond to the memory cell array 210 and may be coupled to a page buffer group 233 through bit lines BL1 to BLn. The PLC group may correspond to the page included in any of the memory blocks BLK1 to BLKz.

Referring to FIG. 8, the corrective program operation may be performed on the N-th PLC group immediately after the normal program operation on the N-th PLC group.

Referring to FIG. 8, the corrective program operation may be performed selectively on PLCs supposed to have threshold voltages corresponding to one or more program states vulnerable to the QCL or cell-to-cell coupling (CTCC) among all the PLCs within the N-th PLC group.

According to an embodiment of the present invention, the program states vulnerable to the QCL or CTCC may be heuristically predetermined. In the example of QCLs illustrated in FIG. 8, lower program states P1 to P3 and higher program states P29 to P31 may be heuristically predetermined as the program states vulnerable to the QCL or CTCC among entire states, i.e., an erase state E and 31 program states P1 to P31.

Referring to FIG. 8, during the corrective program operation on the N-th PLC group, programmed may be the PLCs supposed to have threshold voltages corresponding to the lower program states P1 to P3 and higher program states P29 to P31, which are heuristically predetermined as vulnerable to the QCL or CTCC, and program-inhibited may be remaining PLCs.

Referring to FIG. 8, during the corrective program operation on the N-th PLC group, the storage device 130 may perform a logical operation on data loaded on the first to n-th page buffers PB1 to PBn in the page buffer group 233 to update the data loaded on the first to n-th page buffers PB1 to PBn to select PLCs as the target of the corrective program operation among the entire PLCs within the N-th PLC group.

Referring to FIG. 8, during the corrective program operation on the N-th PLC group, the storage device 130 may program the selected PLCs by applying program pulses and verification pulses in between the program pulses to program the selected PLCs to have threshold voltages corresponding to the predetermined program states P1 to P3 and P29 to P31. The remaining PLCs other than the selected PLCs may be program-inhibited among the entire PLCs within the N-th PLC group during the corrective program operation.

According to an embodiment of the present invention, for the same program state, the verification pulse to be applied during the corrective program operation may have a higher level than the verification pulse to be applied during the normal program operation.

According to an embodiment of the present invention, during the corrective program operation, a series of consecutive program pulses may be applied to the N-th PLC group without the intervention of any verification operation in between the application of the series of consecutive program pulses. According to an embodiment of the present invention, the series of consecutive verification pulses may be applied to the N-th PLC group after the completion of the series of consecutive program pulses.

According to an embodiment of the present invention, during the corrective program operation, the consecutive application of the series of consecutive program pulses and then the consecutive application of the series of consecutive verification pulses configures a single program loop. According to an embodiment of the present invention, the selected PLCs within the N-th PLC group may be programmed and verified through one or more program loops to have threshold voltages corresponding to the predetermined program states P1 to P3 and P29 to P31. According to an embodiment of the present invention, during the corrective program operation, a program loop comprises a series of consecutive program pulse application operations and then a series of consecutive verification operations. The series of consecutive program pulse application operations may be performed without the intervention of any verification operation in between the series of consecutive program pulse application operations. After completion of the series of consecutive program pulse application operations, the series of consecutive verification operations may be performed.

During one or more program pulse application operations in the corrective program operation, one or more program pulses may be applied to the selected PLCs within the N-th PLC group while updating, according to the data loaded on the page buffers PB1 to PBn, an operational mode of each of the selected PLCs between the program-permission mode and the program-inhibition mode. Among the selected PLCs within the N-th PLC group, the selected PLC or a PLC under the program-permission mode will be programmed through the application of a program pulse thereto. The remaining PLC or a PLC under the program-inhibition mode will not be programmed despite the application of a program pulse thereto.

During each of one or more program pulse application operations in the corrective program operation, a single program pulse may be applied to the selected PLCs, which are supposed to have the threshold voltages corresponding to the target program state through the single program pulse, after the update of the data loaded on the page buffers PB1 to PBn. That is, the selected PLCs supposed to have the threshold voltages corresponding to the target program state may be under the program-permission mode for the program pulse application operation in the corrective program operation. The page buffers PB1 to PBn may be reset for the remaining PLCs other than the selected PLCs of the target program state and those remaining PLCs may be under the program-inhibit mode for the program pulse application operation in the corrective program operation. For example, the target program state may be any of the predetermined program states P1 to P3 and P29 to P31.

During the corrective program operation, it is the logical operation performed in between current and subsequent ones among the program pulse application operations that determines whether the selected PLCs, which is supposed to have the threshold voltages corresponding to the predetermined program states P1 to P3 and P29 to P31 vulnerable to the QCL or CTCC among all the PLCs within the N-th PLC group, is under the program-permission mode or the program-inhibition mode for the subsequent program pulse application operation. The logical operation may be performed on reference data and current program data, the reference data representing the target program state, for which a corresponding program pulse to be applied during the subsequent program pulse application operation, and the current data being currently staying loaded on each of the page buffers PB1 to PBn for the current program pulse application operation. The reference data may be page data representing the target program state, for which a corresponding program pulse to be applied during the subsequent program pulse application operation. The current data is one currently staying loaded onto the page buffers PB1 to PBn for the current program pulse application operation. The result of the logical operation may be reflected onto each of the page buffers PB1 to PBn for the subsequent program pulse application operation. The reflection may become the current data staying loaded onto each of the page buffers PB1 to PBn for the subsequent program pulse application operation. Various embodiments of loading the current data onto the page buffers PB1 to PBn for the current program pulse application operation will be discussed later.

Described later in detail may be the program pulse application operation of applying a single program pulse or a series of consecutive program pulses and the verification operation corresponding to the program pulse application operation.

Figure 9:
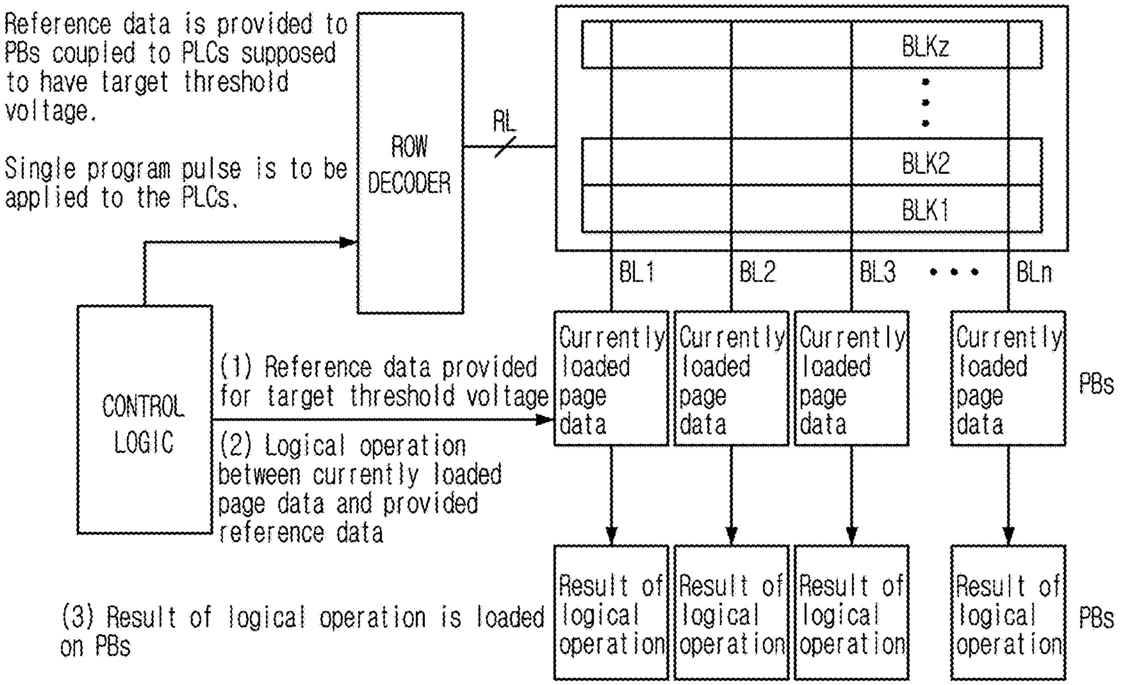
FIG. 9 is a diagram schematically illustrating a logical operation for determining whether a PLC is under a program-permission mode or a program-inhibition mode for a subsequent program pulse application operation according to an embodiment of the present invention.

FIG. 9 is a diagram schematically illustrating a logical operation for determining whether a PLC is under the program-permission mode or the program-inhibition mode for a subsequent program pulse application operation according to an embodiment of the present invention. FIG. 9 schematically shows the storage device 130 for clear description of the logical operation.

In between the current and subsequent program pulse application operations, the control logic 250 may provide the page buffers PB1 to PBn with the reference data for the subsequent program pulse application operation. The corresponding program pulse may be applied to a PLC, which is supposed to have the target threshold voltage corresponding to the target program state. In between the current and subsequent program pulse application operations, the control logic 250 may perform the logical operation on the reference data for the subsequent program pulse application operation and the current data currently staying loaded on the page buffers PB1 to PBn for the current program pulse application operation. The logical operation may cause the respective page buffers PB1 to PBn to update the corresponding program data, which determines each of the selected PLCs as under the program-permission mode or the program-inhibition mode for the subsequent program pulse application operation. The result of the logical operation may be reflected onto each of the page buffers PB1 to PBn for the subsequent program pulse application operation. The reflection may become the current data staying loaded onto each of the page buffers PB1 to PBn for the subsequent program pulse application operation. The logical operation may determine whether each of the selected PLCs is to be under the program-permission mode or the program-inhibition mode for the subsequent program pulse application operation.

For example, at an initial stage before the $1^{st}$ program pulse application operation among the plural program pulse application operations, the control logic 250 may provide the page buffers PB1 to PBn with the reference data corresponding to the predetermined program state P1 for the $1^{st}$ program pulse application operation. The control logic 250 may perform the logical operation on the reference data corresponding to the predetermined program state P1 and initial data currently staying loaded on each of the page buffers PB1 to PBn. During the $1^{st}$ program pulse application operation, the selected PLCs supposed to have the threshold voltage corresponding to the predetermined program state P1 are to become under the program-permission mode as a result of the logical operation. During the $1^{st}$ program pulse application operation, a single program pulse for the predetermined program state P1 is to be applied to the selected PLCs under the program-permission mode. During the $1^{st}$ program pulse application operation, PLCs belonging to the lower program state than the target program state, i.e., the erase state, are to become under the program-inhibition mode as a result of the logical operation. The PLCs of the lower program state than the predetermined program state P1 and therefore under the program-inhibition mode are not to be programmed during the $1^{st}$ program pulse application operation. The control logic 250 may control the storage device 130 to perform the $1^{st}$ program pulse application operation on the selected PLCs according to the program data corresponding to the predetermined program state P1, the data having been updated on the page buffers PB1 to PBn through the logical operation.

In between the $1^{st}$ and $2^{nd}$ program pulse application operations among the plural program pulse application operations, the control logic 250 may provide the page buffers PB1 to PBn with the reference data corresponding to the predetermined program state P2 for the $2^{nd}$ program pulse application operation, during which the selected PLCs supposed to have the threshold voltages corresponding to the predetermined program state P2 are to be under the program-permission mode according to the logical operation with the reference data corresponding to the predetermined program state P2. During the $2^{nd}$ program pulse application operation, a single program pulse for the predetermined program state P2 is to be applied to the selected PLCs under the program-permission mode. During the $2^{nd}$ program pulse application operation, the PLCs belonging to the lower program state than the target program state, i.e., the erase state and the predetermined program state P1 are to become under the program-inhibition mode according to the logical operation with the reference data corresponding to the predetermined program state P2. The PLCs belonging to the lower program state than the predetermined program state P2 and therefore under the program-inhibition mode are not to be programmed during the $2^{nd}$ program pulse application operation. The control logic 250 may control the storage device 130 to perform the $2^{nd}$ program pulse application operation on the selected PLCs according to the program data corresponding to the predetermined program state P2, the data having been updated on the page buffers PB1 to PBn through the logical operation.

Before the last program pulse application operation among the plural program pulse application operations, the control logic 250 may provide the page buffers PB1 to PBn with the reference data corresponding to the predetermined program state P31 for the last program pulse application operation, during which the selected PLCs supposed to have the threshold voltages corresponding to the predetermined program state P31 are to be under the program-permission mode according to the logical operation with the reference data corresponding to the predetermined program state P31. During the last program pulse application operation, a single program pulse for the predetermined program state P31 is to be applied to the selected PLCs under the program-permission mode. During the last program pulse application operation, the PLCs belonging to the lower program state than the predetermined program state P31, i.e., the erase state and the predetermined program states P1 to P3 and P29 to P30 are to become under the program-inhibition mode according to the logical operation with the reference data corresponding to the predetermined program state P31. The PLCs belonging to the lower program state than the predetermined program state P31 and therefore under the program-inhibition mode are not to be programmed during the last program pulse application operation. The control logic 250 may control the storage device 130 to perform the last program pulse application operation on the selected PLCs according to the program data corresponding to the predetermined program state P31, the data having been updated on the page buffers PB1 to PBn through the logical operation.

Although the present invention is disclosed with reference to examples of the PLC or QLC, the present invention will not be limited thereto and may be applied to any storage unit of nonvolatile memory cells each configured to store therein multiple bits.

Although the present invention is disclosed with reference to examples of the program states P1 to P3 and P29 to P31 predetermined as vulnerable to the QCL or CTCC, the present invention will not be limited thereto and any program state may be heuristically predetermined as vulnerable to the QCL or CTCC among all program states.

Figure 10:
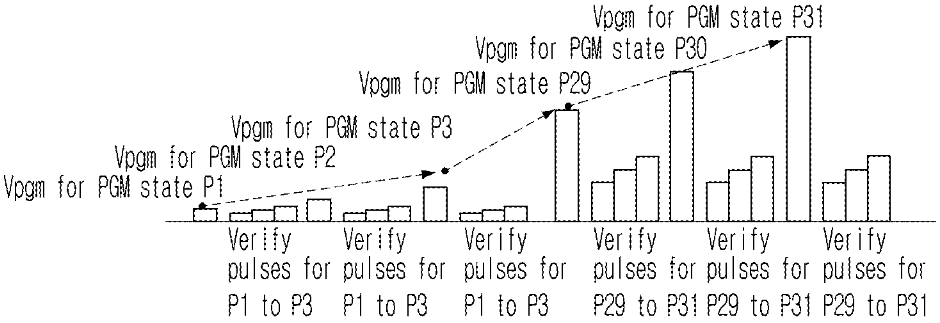
FIG. 10 is diagrams illustrating a corrective program operation of programming selected PLCs within a N-th PLC group by applying program pulses and verification pulses in between the program pulses to program the selected PLCs to have threshold voltages corresponding to predetermined program states according to an embodiment of the present invention.

FIG. 10 is diagrams illustrating the corrective program operation of programming the selected PLCs within the N-th PLC group by applying program pulses and verification pulses in between the program pulses to program the selected PLCs to have threshold voltages corresponding to the predetermined program states according to an embodiment of the present invention.

For example, the predetermined program states may be the program states P1 to P3 and P29 to P31. According to an embodiment of the present invention, the selected PLCs within the N-th PLC group may be programmed and verified through one or more program loops to have threshold voltages corresponding to the predetermined program states P1 to P3 and P29 to P31. The remaining PLCs other than the selected PLCs may be program-inhibited among the entire PLCs within the N-th PLC group during the corrective program operation.

Referring to FIG. 10 as an example, the storage device 130 may perform six program loops respectively for the predetermined program states P1 to P3 and P29 to P31 during the corrective program operation. Each of the program loops may include a single program pulse application operation and a series of consecutive verification operations. The first program loop may include the program pulse application operation for the program state P1 and a series of consecutive verification operations for the program states P1 to P3. The second program loop may include the program pulse application operation for the program state P2 and the series of consecutive verification operations for the program states P1 to P3. The third program loop may include the program pulse application operation for the program state P3 and the series of consecutive verification operations for the program states P1 to P3. The fourth program loop may include the program pulse application operation for the program state P29 and a series of consecutive verification operations for the program states P29 to P31. The fifth program loop may include the program pulse application operation for the program state P30 and the series of consecutive verification operations for the program states P29 to P31. The sixth program loop may include the program pulse application operation for the program state P31 and the series of consecutive verification operations for the program states P29 to P31.

Referring to FIG. 10, during each of the program pulse application operations respectively for the predetermined program states P1 to P3 and P29 to P31, a single program pulses may be applied to the selected PLCs within the N-th PLC group while updating, according to the data loaded on the page buffers PB1 to PBn, an operational mode of each of the selected PLCs between the program-permission mode and the program-inhibition mode. Among the selected PLCs within the N-th PLC group, the selected PLC or a PLC under the program-permission mode will be programmed through the application of a program pulse thereto. The remaining PLC or a PLC under the program-inhibition mode will not be programmed despite the application of a program pulse thereto.

During each of the program pulse application operations respectively for the predetermined program states P1 to P3 and P29 to P31, a single program pulse may be applied to the selected PLCs, which are supposed to have the threshold voltages corresponding to the target program state through the single program pulse, after the update of the data loaded on the page buffers PB1 to PBn. That is, the selected PLCs supposed to have the threshold voltages corresponding to the target program state may be under the program-permission mode for the program pulse application operation for the target program state. The page buffers PB1 to PBn may be reset for the remaining PLCs other than the selected PLCs of the target program state and those remaining PLCs may be under the program-inhibit mode for the target program state. For example, the target program state may be any of the predetermined program states P1 to P3 and P29 to P31.

During the corrective program operation, the storage device 130 may perform the logical operation on the reference data and current program data, as described above, in between current and subsequent ones among the program pulse application operations that determines whether the selected PLCs, which are supposed to have the threshold voltages respectively corresponding to the predetermined program states P1 to P3 and P29 to P31 among all the PLCs within the N-th PLC group, is under the program-permission mode or the program-inhibition mode for the subsequent program pulse application operation. In between the current and subsequent program pulse application operations, the control logic 250 may provide the page buffers PB1 to PBn with the reference data for the subsequent program pulse application operation. The corresponding program pulse may be applied to the selected PLCs, which are supposed to have the target threshold voltages corresponding to the target program state. In between the current and subsequent program pulse application operations, the control logic 250 may perform the logical operation on the reference data for the subsequent program pulse application operation and the current data currently staying loaded on the page buffers PB1 to PBn for the current program pulse application operation. The logical operation may cause the respective page buffers PB1 to PBn to update the corresponding program data, which determines each of the selected PLCs as under the program-permission mode or the program-inhibition mode for the subsequent program pulse application operation. The result of the logical operation may be reflected onto each of the page buffers PB1 to PBn for the subsequent program pulse application operation. The reflection may become the current data staying loaded onto each of the page buffers PB1 to PBn for the subsequent program pulse application operation. The logical operation may determine whether each of the selected PLCs is to be under the program-permission mode or the program-inhibition mode for the subsequent program pulse application operation.

Referring to FIG. 10, the data may be updated on the page buffers PB1 to PBn connected to the bit-lines of the memory cell array 210. A single program pulse application operation of applying a single program pulse to the selected PLCs, which are determined to be under the program-permission mode according to the logic operation within the N-th PLC group. A series of consecutive verification operations may immediately follow the single program pulse application operation. When the selected PLC passes a corresponding one of the verification levels, the selected PLC may become under the program-inhibition mode. By repeating the alternation of the program pulse application operation and the series of consecutive verification operations, all the selected PLCs may become programmed to the predetermined program states P1 to P3 and P29 to P31.

Figure 11:
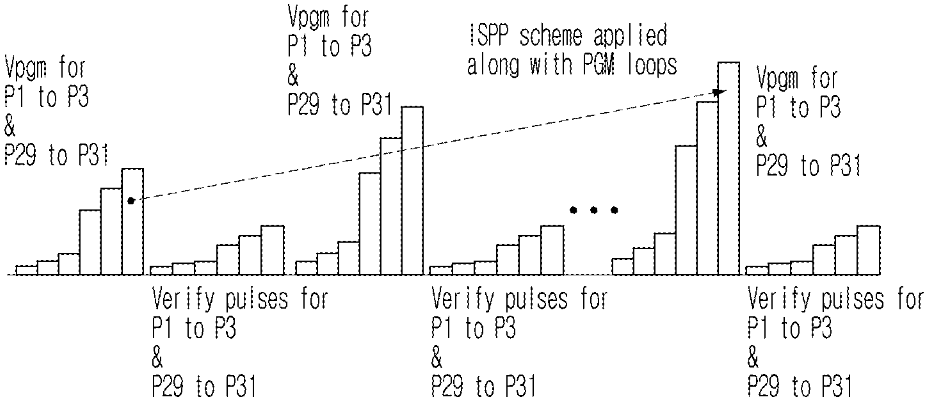
FIG. 11 is diagrams illustrating the corrective program operation of programming the selected PLCs within the N-th PLC group by applying program pulses and verification pulses to program the selected PLCs to have threshold voltages corresponding to the predetermined program states according to an embodiment of the present invention.

FIG. 11 is diagrams illustrating the corrective program operation of programming the selected PLCs within the N-th PLC group by applying program pulses and verification pulses to program the selected PLCs to have threshold voltages corresponding to the predetermined program states according to an embodiment of the present invention.

For example, the predetermined program states may be the program states P1 to P3 and P29 to P31. According to an embodiment of the present invention, the selected PLCs within the N-th PLC group may be programmed and verified through one or more program loops to have threshold voltages corresponding to the predetermined program states P1 to P3 and P29 to P31. The remaining PLCs other than the selected PLCs may be program-inhibited among the entire PLCs within the N-th PLC group during the corrective program operation.

Referring to FIG. 11 as an example, the storage device 130 may perform plural program loops during the corrective program operation. A number of the program loops may depend on the design of the storage device 130. The program loops may proceed until all the selected PLCs become programmed to the predetermined program states P1 to P3 and P29 to P31. Each of the program loops may include a series of consecutive program pulse application operations and a series of consecutive verification operations. Within each of the program loops, the series of consecutive program pulses may be applied along the program levels respectively for the predetermined program states P1 to P3 and P29 to P31. As the series of consecutive program pulse application operations proceed respectively for the predetermined program states P1 to P3 and P29 to P31, the levels of the series of consecutive program pulses may sequentially step up to program the selected PLCs from the lowest program state P1 to the highest program state P31 among the predetermined program states P1 to P3 and P29 to P31. Each of the series of consecutive program pulses may be applied to the selected PLCs supposed to have the threshold voltages corresponding to a corresponding one of the predetermined program states P1 to P3 and P29 to P31 while program-inhibiting remaining PLCs other than the selected PLCs.

In between current and subsequent ones among the series of consecutive program pulse application operations, whether the selected PLCs are under the program-permission mode or the program-inhibition mode for the subsequent program pulse application operation may be set by the logical operation on the reference data and the current program data. Through the logical operation, each of the selected PLCs may be selected for the to-be-applied program pulse, i.e., each of the selected PLCs may become under the program-permission mode for the subsequent program pulse application operation as a result of the logical operation. The current data, which has been updated on each of the page buffers PB1 to PBn coupled to respective PLCs according to the result of the logical operation, may determine whether a corresponding PLC is to become under the program-permission mode or the program-inhibition mode when applying the to-be-applied program pulse during the subsequent program pulse application operation. Such update of the data loaded on the page buffers PB1 to PBn may be performed in between the current and subsequent ones among the series of consecutive program pulse application operations.

During the series of consecutive program pulse application operations within each of the program loops, the series of consecutive program pulses may be applied to the selected PLCs while updating, according to the data loaded on the page buffers PB1 to PBn, an operational mode of each of the cells between the program-permission mode and the program-inhibition mode.

During each of the series of consecutive program pulse application operations within each of the program loops, a single program pulse may be applied to the selected PLCs supposed to have the threshold voltages corresponding to a target program state intended through the single program pulse within the N-th PLC group while updating, according to the data loaded on the page buffers PB1 to PBn, an operational mode of each of the selected PLCs between the program-permission mode and the program-inhibition mode. That is, the selected PLCs of the target program state may be under the program-permission mode for the program pulse application operation. Among the selected PLCs within the N-th PLC group, the selected PLC or a PLC under the program-permission mode will be programmed through the application of a program pulse thereto. The page buffers PB1 to PBn may be reset for remaining PLCs other than the selected PLCs of the target program state and those remaining PLCs may be under the program-inhibit mode for the program pulse application operation. The remaining PLC or a PLC under the program-inhibition mode will not be programmed despite the application of a program pulse thereto.

During each of the series of consecutive program pulse application operations respectively for the predetermined program states P1 to P3 and P29 to P31, a single program pulse may be applied to the selected PLCs, which are supposed to have the threshold voltages corresponding to the target program state through the single program pulse, after the update of the data loaded on the page buffers PB1 to PBn. That is, the selected PLCs supposed to have the threshold voltages corresponding to the target program state may be under the program-permission mode for the program pulse application operation for the target program state. The page buffers PB1 to PBn may be reset for the remaining PLCs other than the selected PLCs of the target program state and those remaining PLCs may be under the program-inhibit mode for the target program state. For example, the target program state may be any of the predetermined program states P1 to P3 and P29 to P31.

During the corrective program operation, the storage device 130 may perform the logical operation on the reference data and current program data, as described above, in between current and subsequent ones among the program pulse application operations that determines whether the selected PLCs, which are supposed to have the threshold voltages respectively corresponding to the predetermined program states P1 to P3 and P29 to P31 among all the PLCs within the N-th PLC group, is under the program-permission mode or the program-inhibition mode for the subsequent program pulse application operation. In between the current and subsequent program pulse application operations, the control logic 250 may provide the page buffers PB1 to PBn with the reference data for the subsequent program pulse application operation. The corresponding program pulse may be applied to the selected PLCs, which are supposed to have the target threshold voltages corresponding to the target program state. In between the current and subsequent program pulse application operations, the control logic 250 may perform the logical operation on the reference data for the subsequent program pulse application operation and the current data currently staying loaded on the page buffers PB1 to PBn for the current program pulse application operation. The logical operation may cause the respective page buffers PB1 to PBn to update the corresponding program data, which determines each of the selected PLCs as under the program-permission mode or the program-inhibition mode for the subsequent program pulse application operation. The result of the logical operation may be reflected onto each of the page buffers PB1 to PBn for the subsequent program pulse application operation. The reflection may become the current data staying loaded onto each of the page buffers PB1 to PBn for the subsequent program pulse application operation. The logical operation may determine whether each of the selected PLCs is to be under the program-permission mode or the program-inhibition mode for the subsequent program pulse application operation.

Referring to FIG. 11, the data may be updated on the page buffers PB1 to PBn connected to the bit-lines of the memory cell array 210. A single program pulse application operation of applying a single program pulse to the selected PLCs, which are determined to be under the program-permission mode according to the logic operation within the N-th PLC group. The series of consecutive verification operations for the predetermined program states P1 to P3 and P29 to P31 may immediately follow the series of consecutive program pulse application operations for the predetermined program states P1 to P3 and P29 to P31. When the selected PLC passes a corresponding one of the verification levels, the selected PLC may become under the program-inhibition mode. By repeating the alternation of the series of consecutive program pulse application operations and the series of consecutive verification operations, all the selected PLCs may become programmed to the predetermined program states P1 to P3 and P29 to P31.

As discussed above, during the corrective program operation on the N-th PLC group, the storage device 130 may perform the logical operation on the current data loaded on the page buffers PB1 to PBn in the page buffer group 233 to update the current data loaded on the page buffers PB1 to PBn to select PLCs as the target of the corrective program operation among the entire PLCs within the N-th PLC group.

According to an embodiment of the present invention, the current data loaded on the page buffers PB1 to PBn may be the program data that has been already loaded on the page buffers PB1 to PBn during an immediately previous program loop for the N-th PLC group. For example, at an initial stage of the corrective program operation to be performed on the N-th PLC group, the current data loaded on the page buffers PB1 to PBn may be the program data that has been already loaded on the page buffers PB1 to PBn during the last program loop within the normal program operation on the N-th PLC group coupled to the N-th word line.

According to another embodiment of the present invention, the current data loaded on the page buffers PB1 to PBn may be the program data that has been re-issued on the page buffers PB1 to PBn for the predetermined program states P1 to P3 and P29 to P31 immediately after a previous program loop for a neighboring PLC group to the N-th PLC group. According to an embodiment, between the normal and corrective program operations on the N-th PLC group, another normal program operation may be performed on the neighboring PLC group to the N-th PLC group. For example, the neighboring PLC group may be the (N−1)-th PLC group coupled to the (N−1)-th word line or the (N+1)-th PLC group coupled to the (N+1)-th word line. The (N+1)-th or (N−1)-th word line may be neighboring to the N-th word line coupled to the N-th PLC group. For example, at an initial stage of the corrective program operation to be performed on the N-th PLC group, the current data loaded on the page buffers PB1 to PBn may be the program data that has been re-issued on the page buffers PB1 to PBn for the predetermined program states P1 to P3 and P29 to P31 immediately after the last program loop within the normal program operation on the (N+1)-th or (N−1)-th group coupled to the (N+1)-th or (N−1)-th word line. According to the embodiment, the peripheral circuit may re-issue the program data on the page buffers PB1 to PBn for the predetermined program states P1 to P3 and P29 to P31 immediately after the last program loop within the normal program operation on the (N+1)-th or (N−1)-th group coupled to the (N+1)-th or (N−1)-th word line.

According to still another embodiment of the present invention, the current data loaded on the page buffers PB1 to PBn may be the program data that has been read from the N-th PLC group and loaded on the page buffers PB1 to PBn for the predetermined program states P1 to P3 and P29 to P31 immediately after a previous program loop for the neighboring PLC group to the N-th PLC group. The read data may be optionally error-corrected and then may be loaded on the page buffers PB1 to PBn. For example, at an initial stage of the corrective program operation to be performed on the N-th PLC group, the current data loaded on the page buffers PB1 to PBn may be the program data that has been read from the N-th PLC group, optionally error-corrected and loaded on the page buffers PB1 to PBn for the predetermined program states P1 to P3 and P29 to P31 immediately after the last program loop within the normal program operation on the (N+1)-th or (N−1)-th group coupled to the (N+1)-th or (N−1)-th word line. In this case, the peripheral circuit may read the program data from the N-th PLC group, optionally get the read data error-corrected and then load the read data or the error-corrected data on the page buffers PB1 to PBn for the predetermined program states P1 to P3 and P29 to P31 immediately after the last program loop within the normal program operation on the (N+1)-th or (N−1)-th group coupled to the (N+1)-th or (N−1)-th word line.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives of the disclosed embodiment. Furthermore, the disclosed embodiments may be combined to form additional embodiments.

Indeed, implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any type of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While the present disclosure contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations, one or more features from a combination can in some cases be excised from the combination, and the combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few embodiments and examples are described and other embodiments, enhancements and variations can be made based on what is described and illustrated in the present disclosure.

What is claimed is:

1. A storage device comprising:

a target group of non-volatile memory cells, each non-volatile memory cell configured to store multiple data bits; and a peripheral circuit including page buffers coupled to the respective memory cells, configured to perform a normal program operation on the target group, and configured to perform, according to data loaded on the page buffers, a corrective program operation on one or more selected memory cells that are supposed to have threshold voltages corresponding to one or more predetermined program states within the target group, wherein:

the corrective program operation includes one or more program loops each comprising one or more program pulse application operations and a series of consecutive verification operations for the one or more predetermined program states;

the peripheral circuit is configured to perform the corrective program operation by applying, during each of the one or more program pulse application operations in each of the one or more program loops, a currently selected program pulse to one or more target memory cells under a program-permission mode, among the one or more selected memory cells, while program-inhibiting remaining memory cells under a program-inhibition mode among the one or more selected memory cells;

the peripheral circuit is configured to apply the currently selected program pulse to the one or more target memory cells by determining, in between current and subsequent ones among the one or more program pulse application operations, each of the one or more selected memory cells as under the program-permission mode or the program-inhibition mode for a subsequent program pulse application operation through update of current data, which is currently loaded on a corresponding one of the page buffers for a current program pulse application operation;

the peripheral circuit is configured to perform the update by performing a logical operation on the current data and reference data representing a target program state, for which a subsequently selected program pulse is to be applied during the subsequent program pulse application operation; and the currently and subsequently selected program pulses belong to program pulses to be applied for the one or more predetermined program states, and the target program state belongs to the one or more predetermined program states.

2. The storage device of claim 1, wherein:

a number of the multiple data bits is ‘n’, where n is a natural number of 2 or more; and the one or more predetermined program states belong to $2^n$ states.

3. The storage device of claim 2, wherein:

the $2^n$ states include an erase state and $1^{st}$ to $(2^n-1)^{th}$ program states of an ascending order; and the one or more predetermined program states includes at least one among the $1^{st}$ and relatively lower program states which are cell-to cell coupling (CTCC) or among relatively higher program states and $(2^n-1)^{th}$ program state which are vulnerable to quick charge loss (QCL).

4. The storage device of claim 3, wherein:

levels of the program pulses are configured to step up according to the one or more predetermined program states; and levels of the verification pulses are configured to step up according to the one or more predetermined program states.

5. The storage device of claim 4, wherein the peripheral circuit is configured to perform, during each of the one or more program loops, the series of consecutive verification operations by consecutively applying respective verification pulses to the target group.

6. The storage device of claim 5, wherein:

the peripheral circuit is configured to perform the one or more program loops respectively for the one or more predetermined program states;

the one or more program pulse application operations within each of the one or more program loops include a single program pulse application operation for a corresponding one among the one or more predetermined program states;

the peripheral circuit is configured to perform, during each of the one or more program loops, the single program pulse application operations by applying a single program pulse to the target group; and a level of the single program pulse is configured to step up over the one or more program loops respectively for the one or more predetermined program states.

7. The storage device of claim 5, wherein:

the one or more program pulse application operations within each of the one or more program loops include a series of consecutive program pulse application operations for the respective one or more predetermined program states; and the peripheral circuit is configured to perform, during each of the one or more program loops, the series of consecutive program pulse application operations by consecutively applying respective program pulses to the target group.

8. The storage device of claim 1, wherein:

the normal program operation includes one or more program loops each comprising one or more program pulse application operations and one or more verification operations for each of program states representing combination of the multiple data bits; and a verification pulse to be applied for a selected one among the one or more predetermined program states during the verification operation within the corrective program operation has a higher level than a verification pulse to be applied for the selected program state during the verification operation within the normal program operation.

9. The storage device of claim 1, wherein the current data currently loaded on the corresponding page buffer for the current program pulse application operation is data loaded, by the peripheral circuit, on the corresponding page buffer during an immediately previous program loop for the target group.

10. The storage device of claim 9, wherein the immediately previous program loop for the target group is a last program loop within the normal program operation for the target group.

11. The storage device of claim 1, further comprising a neighboring group of non-volatile memory cells each configured to store therein multiple data bits, the neighboring group being adjacent to the target group, wherein the peripheral circuit is configured to perform the normal program operation on the neighboring group between the normal and corrective program operations on the target group.

12. The storage device of claim 11, wherein the current data currently loaded on the corresponding page buffer for the current program pulse application operation is data re-issued, by the peripheral circuit, on the corresponding page buffer for the one or more predetermined program states immediately after a previous program loop for the neighboring group.

13. The storage device of claim 12, wherein the previous program loop for the neighboring group is a last program loop within the normal program operation on the neighboring group.

14. The storage device of claim 11, wherein the current data currently loaded on the corresponding page buffer for the current program pulse application operation is data read from the target group and loaded, by the peripheral circuit, on the corresponding page buffer for the one or more predetermined program states immediately after a previous program loop for the neighboring group.

15. The storage device of claim 14, wherein the previous program loop for the neighboring group is a last program loop within the normal program operation on the neighboring group.

16. The storage device of claim 14, wherein the peripheral circuit is configured to obtain the read data error-corrected and load the error-corrected data on the corresponding page buffer.

* * * * *